United States Patent [19]

Winter

[11] Patent Number: 4,521,678
[45] Date of Patent: Jun. 4, 1985

[54] BATTERY-POWERED OPTICAL BAR CODE READER AND VOLTAGE REGULATOR THEREFOR

[75] Inventor: Arthur J. Winter, Encino, Calif.

[73] Assignee: Databar Corporation, Eden Praire, Minn.

[21] Appl. No.: 570,677

[22] Filed: Jan. 13, 1984

[51] Int. Cl.³ .............................................. G06K 7/10
[52] U.S. Cl. .................................... 235/472; 235/462; 250/568; 361/92; 340/663
[58] Field of Search ............... 235/462, 472; 250/555, 250/568; 340/653, 663; 307/130; 361/92

[56] References Cited

U.S. PATENT DOCUMENTS

| | | | |
|---|---|---|---|
| 4,072,859 | 2/1978 | McWaters | 250/568 X |
| 4,143,283 | 3/1979 | Graf et al. | 307/130 X |
| 4,160,156 | 7/1979 | Sherer | 235/472 X |
| 4,240,064 | 12/1980 | DevChoudhury | 235/462 X |
| 4,429,236 | 1/1984 | Nitschke | 340/663 X |

Primary Examiner—David L. Trafton
Attorney, Agent, or Firm—Peterson, Wicks, Nemer & Kamrath

[57] ABSTRACT

A battery-powered, microcomputer controlled optical bar code reader automatically turns itself off under certain predetermined conditions, so as to prevent operation when the battery voltage is low, when the microcomputer of the circuitry controlled by the microcomputer is malfunctioning, or when the scanner has been turned on, but is not being used.

19 Claims, 15 Drawing Figures

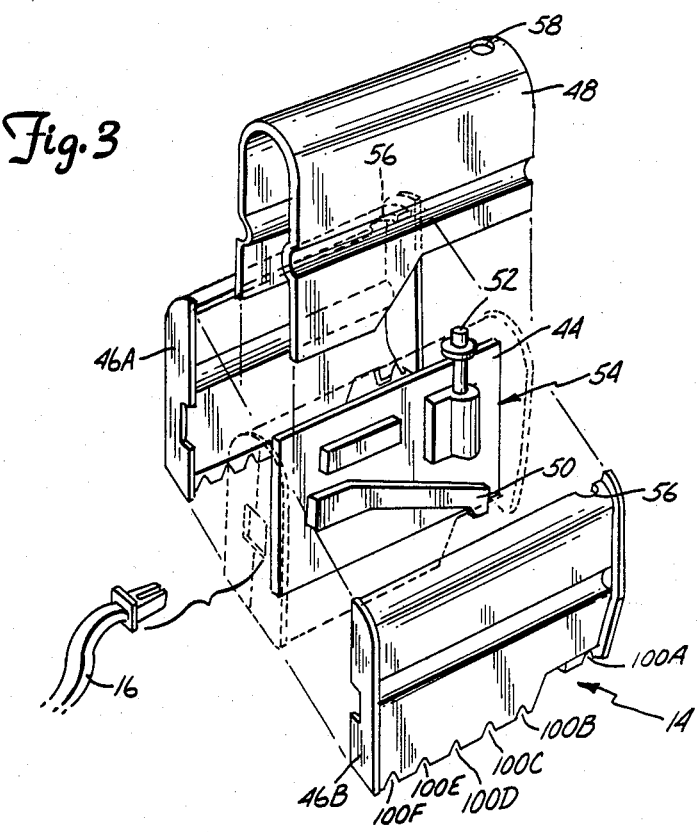
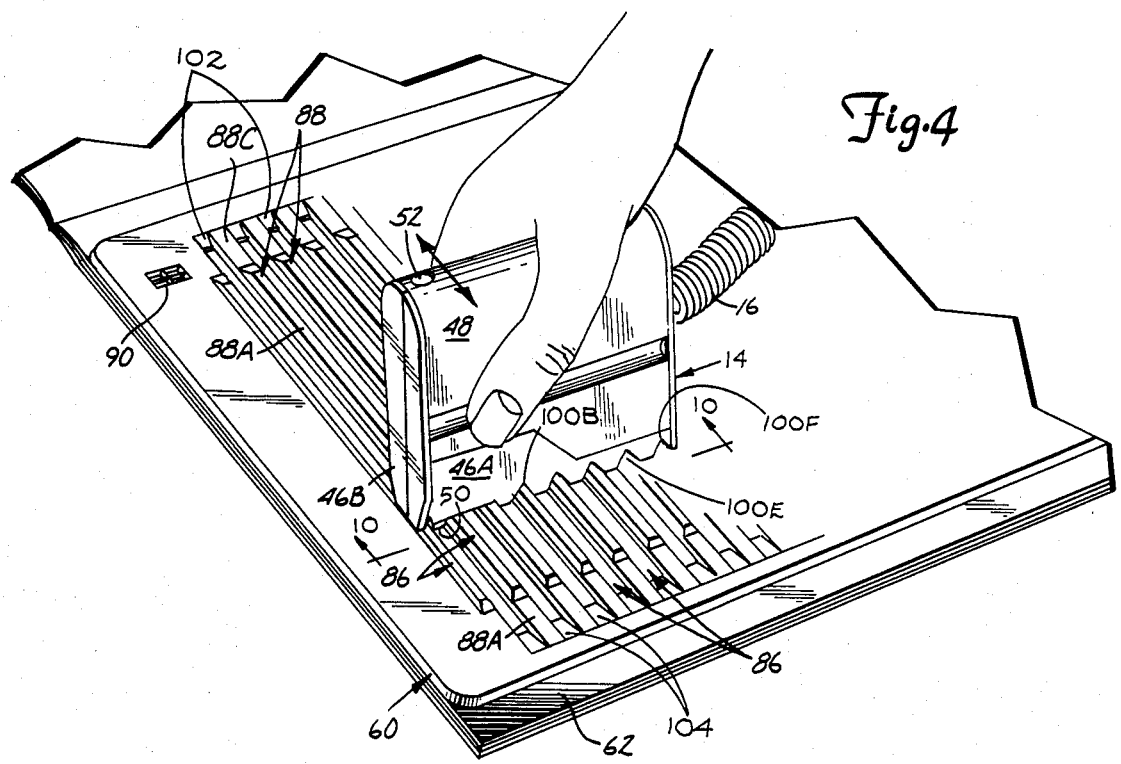

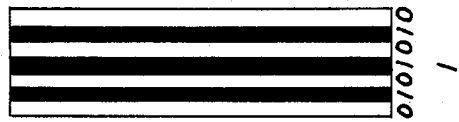
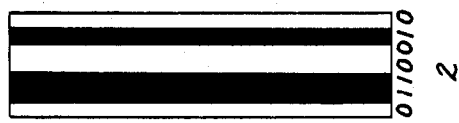
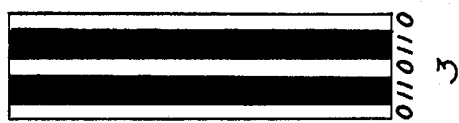
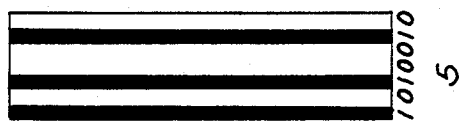
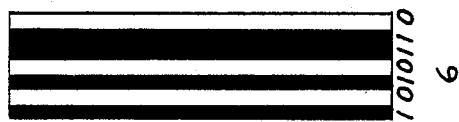
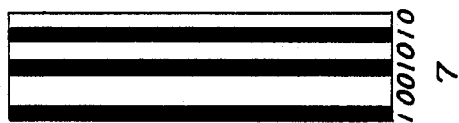
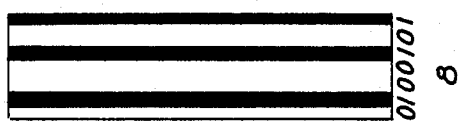
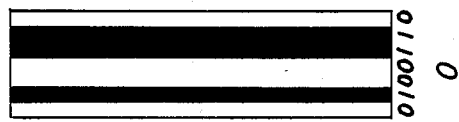
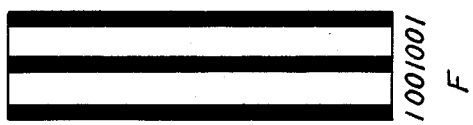
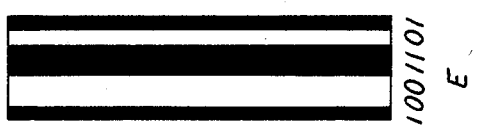
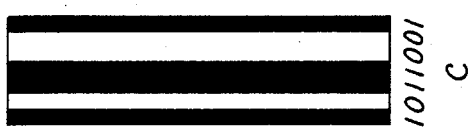
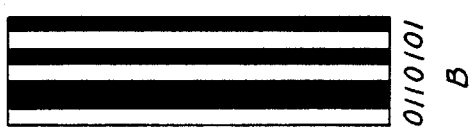
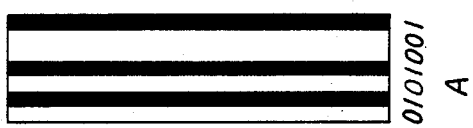
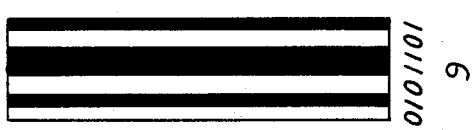
Fig. 11

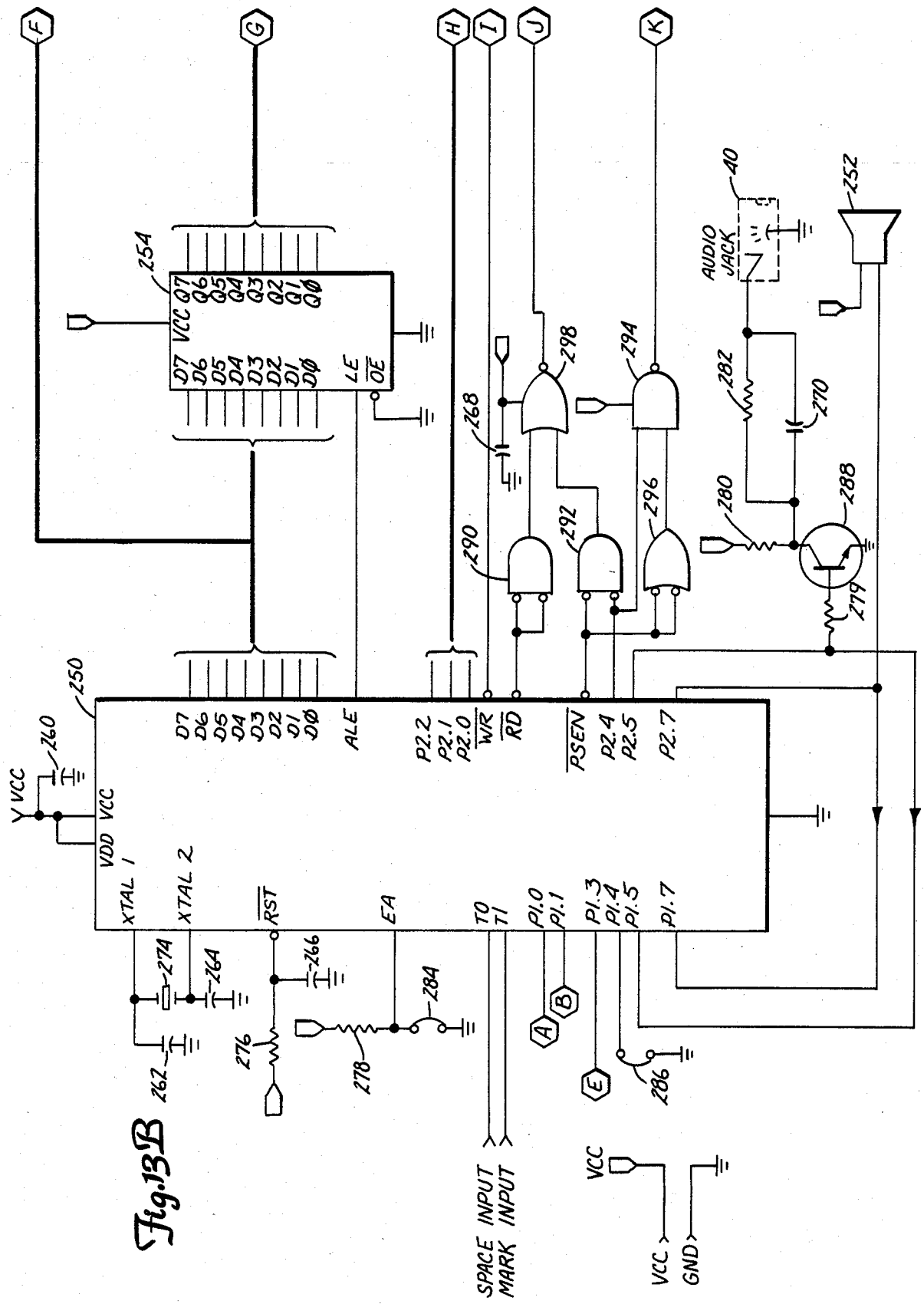

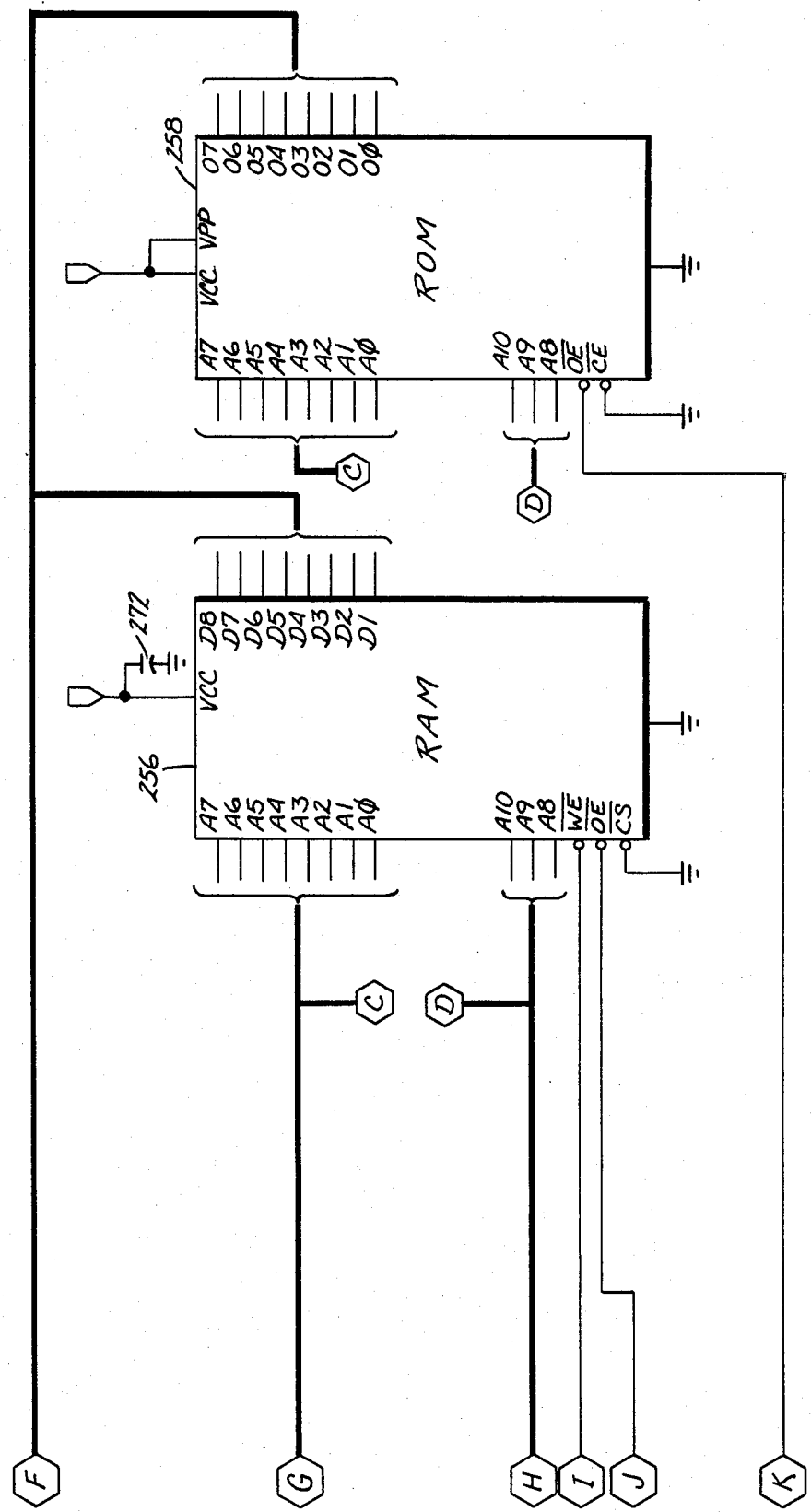

BATTERY-POWERED OPTICAL BAR CODE READER AND VOLTAGE REGULATOR THEREFOR

CROSS-REFERENCE TO RELATED APPLICATIONS

The following copending applications contain subject matter related to this application:

"Self-synchronized Optical Bar Code Reading System", Ser. No. 569,990, filed on Jan. 11, 1984.

"System and Method for Guiding a Hand-held Optical Bar Code Reader", Ser. No. 570,678, filed on Jan. 1, 1984.

"Optical Scanning Reader System for Loading Computers", Ser. No. 570,674, filed on Jan. 13, 1984.

"System for Reading an Optical Bar Code", Ser. No. 570,673, filed on Jan. 13, 1984.

"Optical Bar Code", Ser. No. 569,989, filed on Jan. 11, 1984.

BACKGROUND OF THE INVENTION

1. Field of the Invention

This invention relates generally to optical bar code sensing systems, and pertains more particularly to a battery-operated bar code reading system and a circuit for regulating the voltage supplied to such a system.

2. Description of the Prior Art

Over the past decade, significant advances in solid state technology and digital electronics have permitted the development of low cost digital computers which are used in an ever increasing number of industrial and consumer products. One segment of the computer industry which has grown rapidly in recent years is the "home computer" market which encompasses those digital computers which are used, for the most part, for personal rather than commercial applications and which are affordable to a large segment of the consuming public.

With the rapid growth of the computer market, there has been an accompanying growth in the computer software industry which provides computer programs usable with various computers. The number of programs available for most popular home computer models, for instance, has grown at an extremely rapid rate.

There are a number of ways in which a computer user can obtain a new program. First, the user can write the program himself. In many cases, however, this is not practical or desirable because the user either lacks the time or skill to write such a program, or because the program is already commercially available.

Second, the program may be printed in a computer magazine or book. In that case, the user normally has to enter the program through the keyboard of the computer. For many programs, that is a very time-consuming task and is very prone to errors.

Third, many programs are available to computer users is prerecorded form, either on magnetic tape cassettes, or on floppy disks. The tape cassette requires, of course, that the computer user have a tape recorder which can be used to play the cassette and supply signals to the computer through the cassette input port. In the case of the floppy disk, the computer user must have a floppy disk drive in order to transfer the program from the disk to the computer.

Another known way in which information can be stored is in the form of optical bar codes. At the present time, bar codes are used extensively in many fields to store information on products, packages and labels which can be read by machine and provided to a computer. One well-known example is the Uniform Product Code (UPC) which is found on most packages sold in grocery stores. The UPC bar code is read by a scanning system at the checkout counter, and a computer automatically determines the price of the product and provides a cash register receipt listing the product name and price. This eliminates the time-consuming and error prone manual checkout procedure which had been used for many years in grocery stores.

An optical bar code consists of a specific number of what have heretofore been referred to as light elements, modules or pixels, and which herein will be called "cells". Each cell is in the form of either a dark bar ("mark") or a light bar ("space"), the various dark and light bars being arranged parallel to one another. A "mark" represents a "1" and a "space" represents as "0". The bar code data is read by relative movement of the bar code with respect to an optical reader in a direction which is perpendicular to the marks and spaces.

The prerecording of computer programs or data on a printed sheet in the form of lines of optical bar code data is attractive, since it is well suited to mass production techniques, and can conveniently be distributed in magazine and book form. In recording computer information in the form of multiple lines of bar code on printed sheets, it is important to maximize the amount of data stored on a single sheet, so that an entire program or data set can be recorded on a single sheet or on a relatively small number of sheets. The bar codes and bar code readers used in the past, however, have had a much lower data density than is desirable for recording computer programs.

A typical prior art optical bar code uses nine cells to record four bits of information. Each four-bit "character" or "nibble" begins with a "mark", a "space", and a "mark" of single width cells (i.e. binary 101). The remaining six cells are used to designate the four bits of data. In reading the code, the reader must be capable of distinguishing between a single-cell bar containing a single "mark" and a double-cell bar containing two "marks" which are adjacent one another. Similarly, the reader must be able to distinguish between a single-cell bar containing a single "space" and a double-cell bar containing two "spaces" which are adjacent one another. The prior art code uses the "space" between two "marks" (i.e. binary 101) at the beginning of each character to obtain a timing value for a single-cell bar. This timing value is then compared to the time duration of each subsequent "mark" or "space" bar in the character to distinguish between single and double-cell bars.

The above technique has a number of disadvantages. First, it requires nine cells to describe only four bits of data, with the first three cells being used solely for timing purposes.

Second, inaccuracies can occur if the hand-held reader is being accelerated or decelerated at the beginning of the character, or if the reader jerks slightly while the reader is passing over the initial three cells (101) of the character.

Third, in order to enhance the reliability in distinguishing between single and double bars, the prior art optical bar codes have typically required a three-to-one ratio between the physical width of a double bar and a single bar. In other words, a bar formed by two "marks" or two "spaces" adjacent to one another will have a width which is three times the width of a bar formed by a single mark or a single space. While this enhances reliability, it significantly reduces the amount of information which can be stored in a line of optical bar code.

There is a need for an improved optical bar code which achieves a high reliability in the reading of optical bar codes when using a manually moved reader, and which significantly increases the density of information which can be recorded in a line of optical bar code, this latter feature being important as far as the present invention is concerned. The optical bar code of the present invention does not require the three cells at the beginning of each character simply to provide a timing value for measurement of bar widths. As a result, the number of cells required to represent four bits of data can be reduced, thus increasing the amount of information which can be contained in a single line of optical bar code. With the code of the present invention, reliable reading thereof has been achieved with bar widths which are much smaller than those used in conventional bar codes, and with a two-to-one rather than a three-to-one physical width ratio between double and single "marks" or "spaces".

SUMMARY OF THE INVENTION

The present invention relates to a battery-powered system for reading optical bar codes and converting this type of code into digital data which can, for example, be loaded into a digital computer. The reading system includes a user-actuated power switch and voltage regulator connected to a battery to produce a supply voltage. The system also includes an optical bar code reader and computer means associated therewith which are powered by the supply voltage. As optical bar code characters are scanned, the optical bar code reader provides an electrical output to the computer means which indicates the mark and space bars of the code. The computer means converts the output of the reader to digital data which represents the characters of the optical bar code which has been scanned.

The computer means controls operation of the voltage regulator to provide several important functions which ensure proper operation of the system and avoid excessive drain on the battery in the event that the system is not being used or has malfunctioned. These functions preferably include a power latch-on function, a low voltage warning function, and a nonuse time-out function.

The power latch-on function is performed by the computer means in conjunction with the voltage regulator. When the user actuated power switch is closed to initiate operation of the system, the voltage regulator begins to furnish a supply voltage based upon electrical energy from the battery. The voltage regulator will discontinue providing the supply voltage at the end of an initial time interval unless the computer means provides a signal to the voltage regulator which permits the voltage regulator to continue operation. Upon receiving the supply voltage after the power switch has been closed, the computer means performs predetermined initialization procedures. If the system is functioning properly, these predetermined initialization procedures will be completed successfully by the computer means before the initial time interval elapses, and the computer means will provide a signal to the voltage regulator which permits the voltage regulator to continue to furnish the supply voltage. If the computer means does not successfully complete the prescribed initialization procedures before the predetermined time interval elapses, the voltage regulator is turned off, as well as the remainder of the system's circuitry.

The low voltage warning function is performed by the voltage regulator, the computer means, and an annunciator which provides a warning to the user in response to a signal from the computer means. The voltage regulator monitors the supply voltage which is being provided, and provides a signal to the computer means which indicates a low supply voltage condition when the supply voltage is less than a predetermined value. The computer means provides an appropriate signal to the annunciator which in turn produces a low voltage warning to the user. When this warning has been completed, the computer means discontinues the signal to the voltage regulator which permitted the voltage regulator to continue to operate. As a result, the system is automatically shut down after the low voltage warning has been provided.

The nonuse time-out feature prevents the user from turning on the system (for example by removing the reader from a cradle and thus closing the power switch) and then failing to begin the scanning of a line of optical bar code within a predetermined time interval. Similarly, the time-out function is intended to avoid situations where the user forgets to replace the reader in its cradle (a step which is necessary in order to open the power switch and de-energize the system). The computer means monitors the output of the optical bar code reader and provides a signal to the annunciator if no change in the output of the reader has occurred during the predetermined time interval. Under the control of the computer means, the annunciator provides a warning which indicates to the user that the system will be automatically turned off at the end of another predetermined time interval unless the reader begins to scan bar code lines. If the output of the reader remains unchanged during the predetermined time interval after the warning has been provided, the computer means discontinues the signal to the voltage regulator which causes the voltage regulator to turn off.

BRIEF DESCRIPTION OF THE DRAWINGS

FIG. 3 is an exploded perspective view of the reader of FIG. 1, the view being on a somewhat larger scale and taken from the opposite side;

FIG. 4 is a perspective view showing the reader in use with a special template, the reader being oriented as in FIG. 1 and being hand-propelled across the template for the purpose of reading the optical bar code of the instant invention when printed on a sheet of paper;

FIG. 11 is a diagram showing a seven-cell optical bar code in which each seven cells represent a hexadecimal character (4 bits);

DETAILED DESCRIPTION OF THE PREFERRED EMBODIMENT

1. Bar Code Scanner 10 (FIG. 1)

Figure 1:
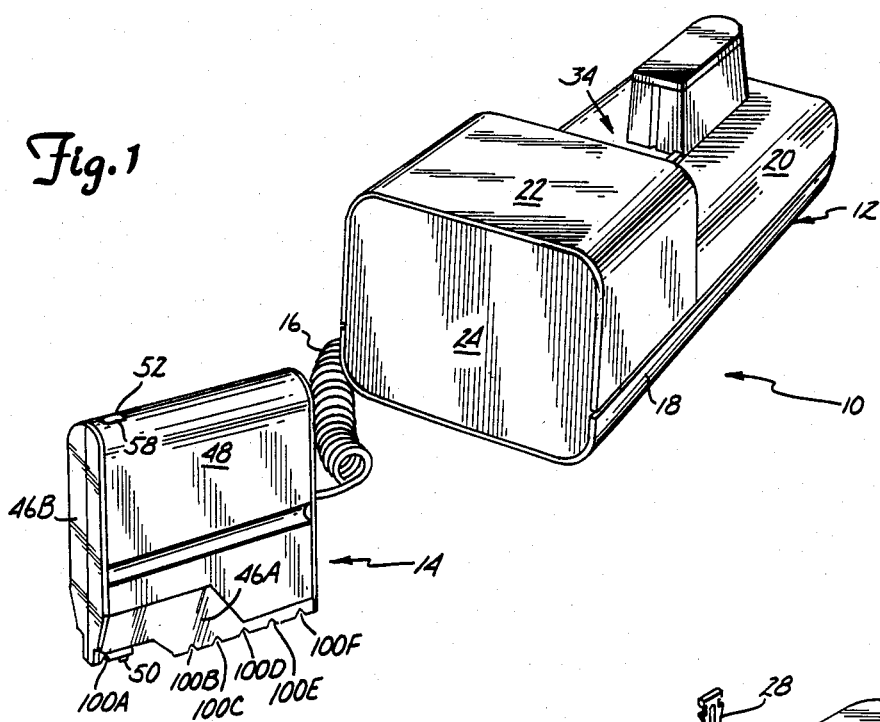
FIG. 1 is a perspective view showing a control unit and a hand-held reader that can be employed in reading the bar code of the present invention.

FIG. 1 shows a low cost, reliable bar code scanner 10, which possesses special utility as an input device for loading computer programs or data into a computer (not shown). The information to be loaded is recorded in the form or lines of optical bar code data on one or more sheets of paper. The bar code scanner 10 includes a control unit 12 and a hand-held reader 14, the two of which are interconnected by a coiled cable 16. The user of the bar code scanner 10 reads the bar code recorded information by manually propelling the hand-held reader 14 along the various data lines constituting the optical bar code. More specifically, the hand-held reader 14 senses the light spaces and dark bars of the bar code and translates the sensed light spaces and dark bars into a pulsating analog signal, the time duration of the peaks and valleys of which is indicative of the bar code data and which signal is supplied to the control unit 12.

2. Control Unit 12 (FIG. 2)

The control unit 12 decodes the incoming signal pulses from the hand-held reader 14 into appropriate byte information. Several lines of byte information are stored by the control unit 12 (depending upon the particular type of computer). When the appropriate amount of byte information has been stored, the control unit 12 transfers that information to the computer (such as a home computer) through an input/output port of the computer (such as the cassette port). The control unit 12 functionally emulates the device (such as a cassette player) which would normally be connected to the computer input.

Figure 2:
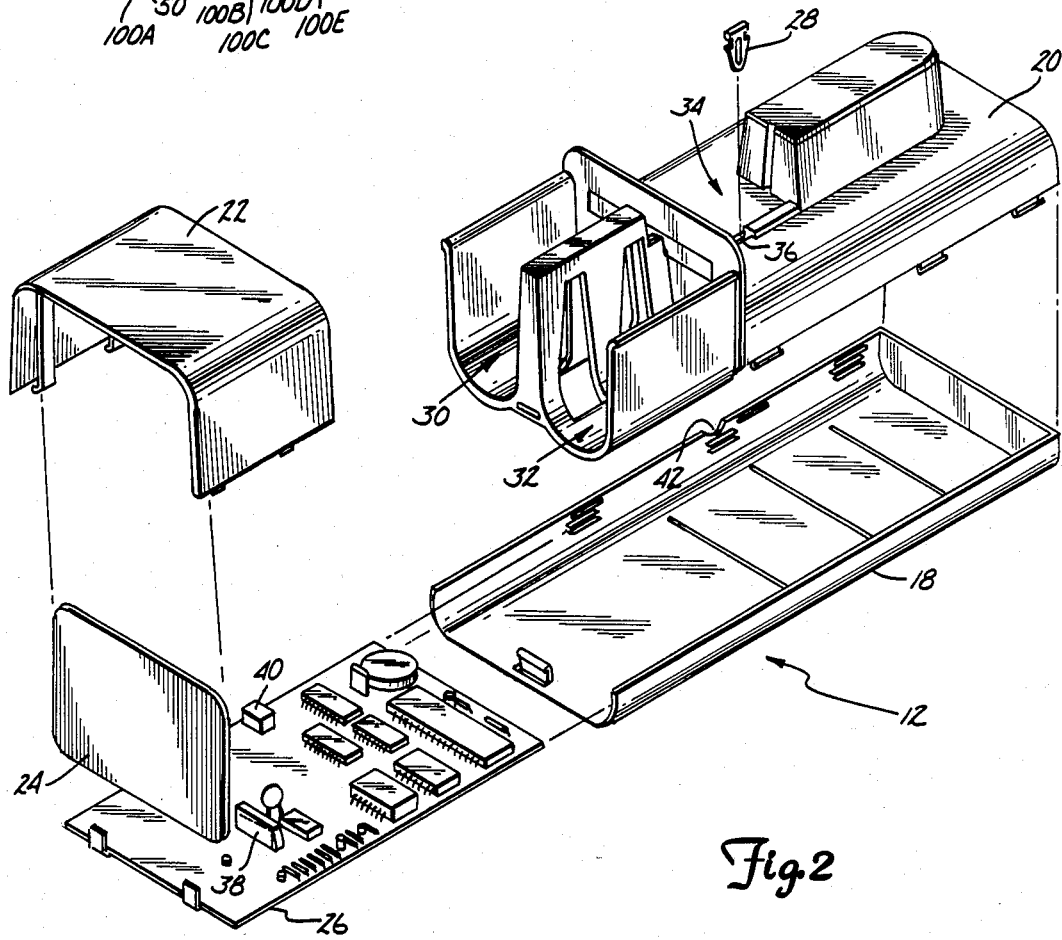
FIG. 2 is an exploded perspective view of the control unit of FIG. 1.

As shown in FIG. 2, the control unit 12 includes a housing base 18, an upper housing 20, a housing cover 22, an access cover 24, a printed circuit board 26, and a power switch plunger 28. The control unit 12 is powered by a battery 29 shown in FIG. 13A comprised of four D cells, the cells being held in compartments 30 and 32 at the front end of the upper housing 20. The access cover 24 is removable to permit the removal and replacement of the cells contained in the compartments 30 and 32.

The upper housing 20 includes a cradle 34 for holding the reader 14 when it is not in use. The power switch plunger 28 extends through an opening 36 to engage a power switch 38 mounted on the printed circuit board 26. When the reader 14 is located in the cradle 34, the plunger 28 is depressed, and the switch 38 is off or open. When the reader 14 is removed from the cradle 34, the plunger 28 rises and the switch 38 closes. This causes power to be supplied to the digital circuitry (FIGS. 13A-13C) of the control unit 12, and also provides power through the cable 16 to the analog sensing circuitry (FIG. 12) of the reader 14.

An audio jack 40 projects through an aperture 42 in the housing base 18 and the upper housing 20 to permit connection of the control unit 12 to the computer by means of a cable (not shown) which extends between the audio jack 40 and the input port of the computer. As already explained, the computer is not illustrated.

3. Reader 14 (FIGS. 3 and 4)

FIG. 3 is an exploded view of the reader 14, which includes a printed circuit board 44, cover housings 46A and 46B, and a cover cap 48. The circuit board 44 carries and supports a fiber optic probe 50, a POWER ON indicator light 52, and analog circuitry at 54 (diagrammed in FIG. 12). The probe 50 directs light downwardly onto the bar code and collects light reflected from the bar code. The analog circuitry 54 converts the reflected light received by the probe 50 to an analog signal having a variable amplitude waveform. The printed circuit board 44 is mounted within the cover housings 46A and 46B, which are covered and held together by the cover cap 48. The probe 50 projects downwardly and has its tip exposed at the bottom of the cover housings 46A and 46B to direct light downwardly onto the sheet being scanned, and to receive refected light from the sheet. The POWER ON indicator light 52 extends upwardly from the printed circuit board 44 and its light can be viewed through an aperture 56 in the cover housings 46A and 46B and an aperture 58 in the top of the cover cap 48. When the reader 14 has been removed from the cradle 34 and power is being supplied from the control unit 12 to the reader 14, the POWER ON indicator light 52 is turned on.

In recording computer programs or data in the form of bar code data on printed sheets, it is important to maximize the amount of information stored on a single sheet. The need for high density recording requires that the individual bars must be as narrow as possible and closely spaced. This requirement, however, presents several important problems as far as the use of a conventional hand-held reader is concerned.

First, as the width (or height if the sheet is viewed vertically) of the bar code lines and the spacing between lines are decreased in order to increase the number of lines per sheet, it becomes increasingly difficult to move an ordinary reader along the line without inadvertently wandering to an adjacent line during scanning movement. This is aggravated by the natural tendency of a person to move a hand-held reader in an arc rather than along a straight line when the movement of such a reader is unguided. Second, the fluctuations in speed during unguided movement of a typical reader can interfere with the accurate sensing of bars of different widths.

In practicing the present invention, as will be understood from FIG. 4, the above problems are overcome by employing a special guide template 60, which overlies a data sheet labeled 62. The template 60 provides a guide for maintaining alignment of the hand-held reader 14 as it is moved along each of the lines of bar code contained on the sheet 62. The guiding provided by the template 60 not only ensures alignment of the reader 14 with a single line during movement from one end to another, but also aids the user in achieving a more uniform rate of movement of the reader 14 along the line.

4. Sheet 62 (FIG. 5)

Figure 5:
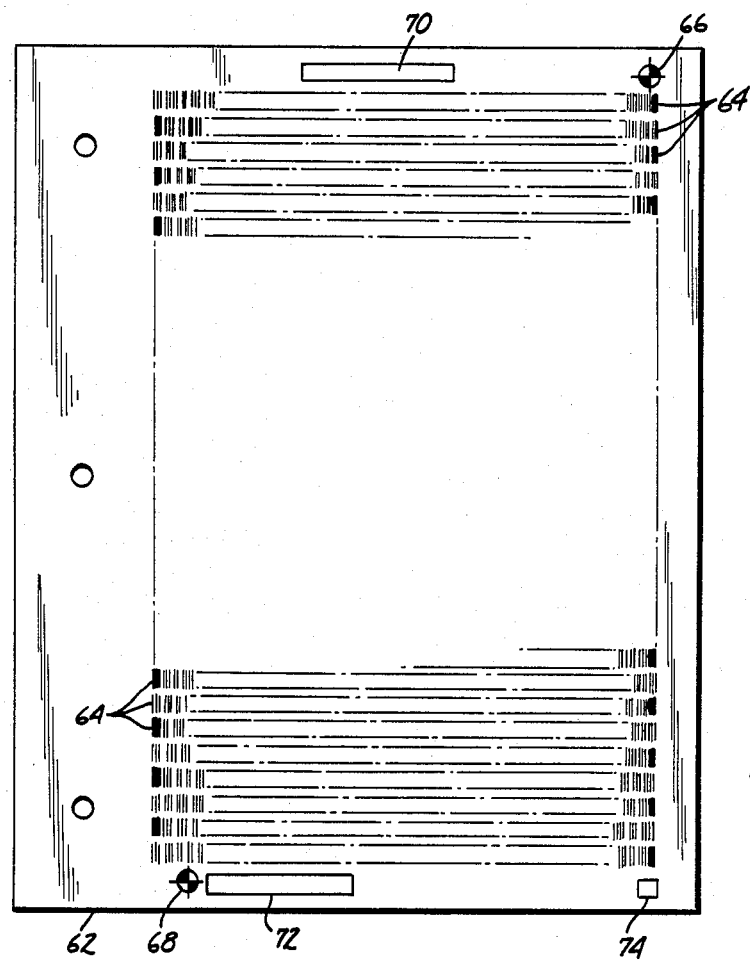
FIG. 5 is a top view of the underlying sheet of FIG. 4, the sheet having a number of lines of optical bar code printed thereon.
Figure 9:
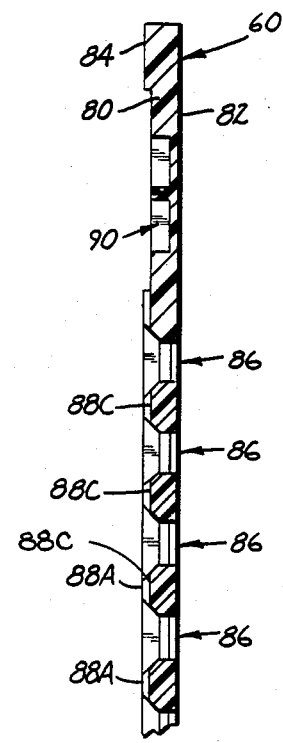
FIG. 9 is a sectional view taken in the direction of line 9—9 of FIG. 6.

FIG. 5 shows a paper sheet 62 having one bar code configuration printed thereon. In this embodiment, the sheet 62 includes a bar code containing thirty-one bar code lines 64, a pair of alignment marks 66 and 68, and printed information blocks 70, 72, and 74. The sheet 62 can be manufactured either as an individual unit, or as a page which is printed and distributed as part of a larger document, such as a computer user magazine. The information block 70 may contain a program and page number; the information block 72 may provide a magazine name and volume number, and the information block 74 can provide a magazine page number.

The bar code lines 64 are arranged so that the first line (the top line as viewed in FIG. 5) is read from left to right, the second line is read from right to left, the third line is read from left to right, and so on in alternating fashion across the sheet. This greatly increases the speed at which the lines 64 can be read, since the reader 14 does not have to be returned to the same side of the sheet 64 each time a line is read in order to read the next line 64. This also reduces the likelihood that a line 64 will be skipped during the reading process. As will be discussed in further detail later, the template 60 assists in this back and forth serpentine movement of the reader 14 by permitting accurate and rapid indexing from one line 64 to the next at the ends of each line.

5. Template 60 (FIGS. 6-10)

As shown in detail in FIGS. 6 through 9, the template 60 is in the form of a plate having a top surface 80, a generally flat bottom surface 82, an outer rim 84, a plurality of parallel slots 86, a plurality of guide ribs 88, and a pair of alignment reticules 90 and 92.

In use, the template 60 is placed over and aligned with the sheet 62 so that each slot 86 lies directly over one of the lines 64 of the bar code printed on the sheet 62. Proper registry of the template 60 with the sheet 62 is achieved by aligning the cross hairs of the reticules 90 and 92 with the alignment marks 66 and 68, respectively, on the sheet 62. In order to avoid accidental relative movement or slippage of the template 60 and the sheet 62 once alignment has been achieved, a mechanical restraint system is provided. In this particular embodiment, the mechanical restraint system is in the form of a pair of textured or roughened surface bands 94 and 96 adjacent the upper and lower edges (as viewed in FIG. 7) of the bottom surface 82 which engage the surface of the sheet 62 to prevent unwanted shifting.

Ribs 88 constitute guide tracks for the hand-held reader 14, so that the probe 50 will be aligned over and extend downwardly into one of the slots 88, and will move longitudinally within that slot 88 as the reader 14 is moved along a line of bar code recorded on the sheet 62. The bottom surface of the cover housings 46A and 46B of the reader 14 has a plurality of parallel grooves or notches 100A-100F (see FIGS. 3 and 10) which mate with the ribs 88 to guide the movement of the reader 14. As long as at least two of the grooves or notches 100A-100F remain in engagement with the ribs 88, the probe 50 remains in one of the slots 86.

Each of the ribs 88 has a central section 88A which has a first height, and left and right end sections 88B and 88C which are of a second or lower height. The central section 88A is preferably as long as or slightly longer than the various lines 64 of the bar code. The left and right end sections 88B and 88C are of reduced height to permit easy indexing of the reader 14 to the next line down when the reader 14 has reached the end of a line of bar code. The left and right sections 88B and 88C of the ribs 88 are still of sufficient height so that the user will have a positive indication that the reader 14 has been incrementally shifted on the template 60 by one line only rather than by two or three lines.

Having the length of the slots 86 greater than the length of the lines 64 of bar code has another advantage. It provides a distance at the beginning and end of each scanning movement of the reader 14 which enables the reader 14 to be accelerated before a reading period is initiated and to be decelerated after a reading period has been completed. As a result, the manual movement of the reader 14 along lines 64 of bar code (which occurs as the reader 14 moves over the central portions 88A) is more nearly uniform in velocity than is achieved with unguided movement and with movement that starts immediately at the beginning of the scanning of a line of bar code.

Figure 8:
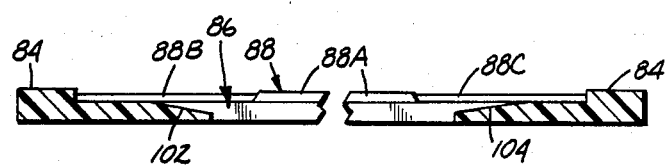
FIG. 8 is a sectional view taken in the direction of line 8—8 of FIG. 6 but with a center portion broken away.
Figure 10:
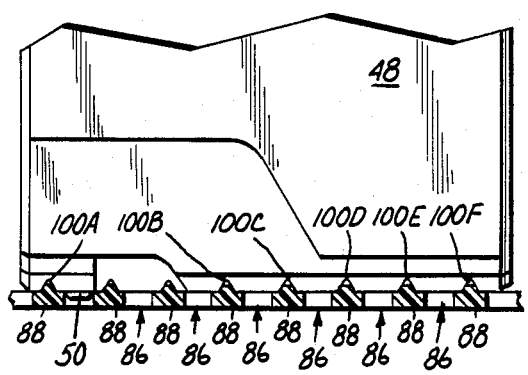
FIG. 10 is a fragmentary side view of the lower portion of the reader, the view being taken in the direction of line 10—10 of FIG. 4 so that a portion of the template is sectionally included.

To achieve a more uniform reading speed, there are located at the left and right ends of each slot 86, as best viewed in FIG. 8, end ramps 102 and 104, respectively. The end ramps 102 and 104 lift the probe 50 out of the particular slot 86 in which it is then received when the reader 14 is moved beyond either end of the slot 86.

Figure 6:
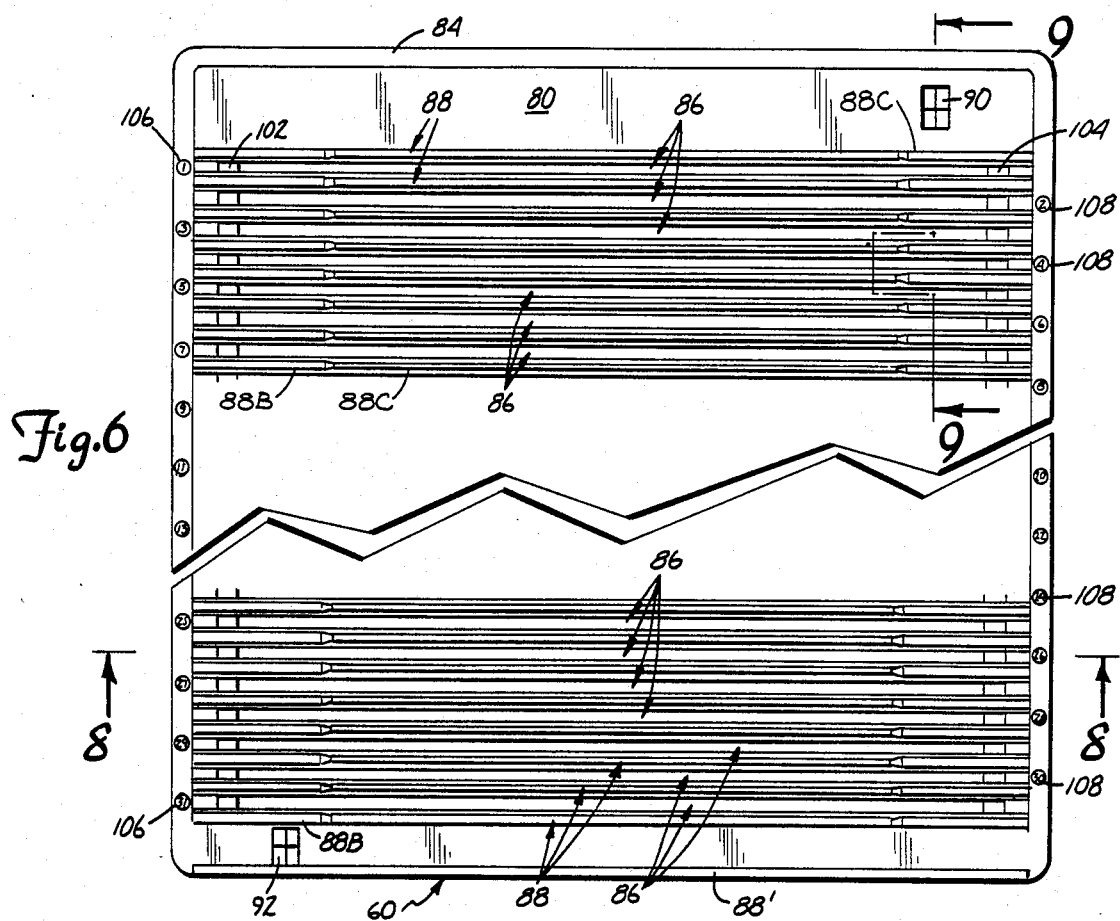
FIG. 6 is a top view of the template, the upper edge thereof spatially corresponding to the left edge as viewed in FIG. 4.
Figure 7:
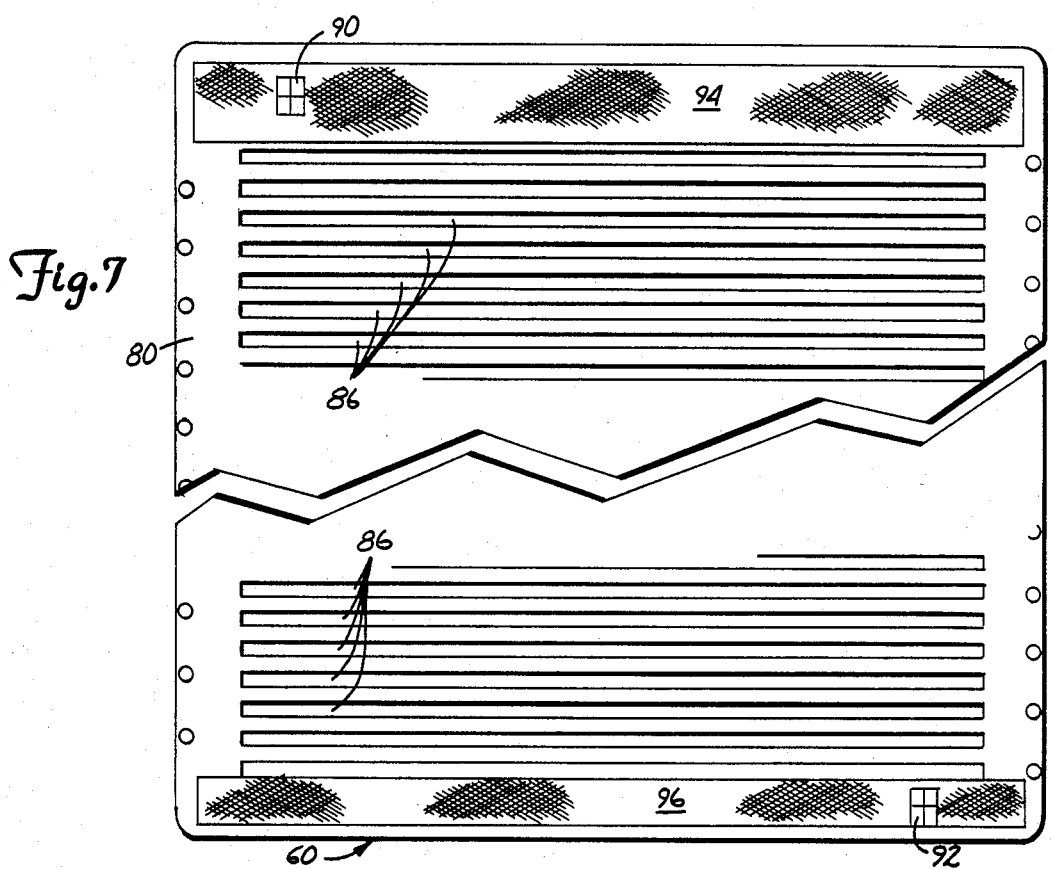
FIG. 7 is a bottom view of the template.

As shown in FIG. 6, the parallel ribs 88 form the slots 86, the ribs 88 being spaced sufficiently so that a slot 86 is provided between each pair. In addition, there is a lowermost rib 88' along the lower edge of the template 60, as viewed in FIG. 6, to aid in guiding the movement of the reader 14 when the lowermost line of bar code is being read. In that case, the groove 100A receives the rib 88 immediately above the lowermost slot 86, and the groove 100B receives rib 88'. It will be appreciated that the rib 88', while lowermost in FIG. 6, would appear at the right in FIG. 4 if the full template 60 were shown in this figure.

In the embodiment shown in FIG. 6, circles 106 and 108, containing indicia denoting the line numbers of specific lines 64 of the bar code, are provided along the rim 84 adjacent the corresponding slot 86. In this embodiment, odd numbered lines are designated by the circles 106 along the left hand portion of the rim 84, while even numbered lines are designated by the circles 108 along the right hand portion of the rim 84. The positioning of the circles 106 and 108 along the left and right hand portions of the rim 84, respectively, also serves as a reminder of the user of the direction of movement of the reader 14 along template 60. The odd numbered lines are to be scanned from left to right, while the even numbered lines are to be scanned from right to left.

The bar code scanner 10, when used in conjunction with the template 60, provides a simple yet accurate and rapid means for loading computer programs or data into a computer. When the user decides to load information printed in bar code form on a sheet into a computer, the bar code scanner 10 is connected via the input port to the computer. The template 60 is aligned over the sheet 62, the hand-held reader 14 is removed from cradle 34, and the lines 64 of bar code are read by moving the hand-held reader 14 back and forth in a serpentine fashion across the template 60, the reader 14 being constrained for rectilinear movement by the ribs 88 of the template 60. Of course, the probe 50, in this way, travels in the particular slot 86 that is in alignment with the data line 64 that is to be read at this time. With the present invention, a typical program for, say, a home computer can be scanned and transferred to the computer, error free, in less than five minutes.

6. The Optical Bar Code (FIG. 11)

FIG. 11 shows an optical bar code having several important features. First, the greatly enlarged bar code of FIG. 11 uses a combination of seven cells to represent a hexadecimal character (which is the equivalent of four bits of data). In the prior art, on the other hand, bar codes typically include nine cells to represent four bits of data. In FIG. 11, individual codes are shown for each of the hexadecimal characters 0 through 9 and A through F.

Second, in the optical bar code of FIG. 11, the width of a double-cell (i.e. two consecutive "marks" or two consecutive "spaces") can be only twice the width of a single-cell bar or module. In the prior art, a physical width ratio of three-to-one between a double bar and a single bar has usually been required in order to ensure a reliable reading of the code.

Third, with the bar code shown in FIG. 11, no more than two "marks" or two "spaces" appear consecutively (with the exception of the end-of-line character described in the next paragraph); the first two cells of each character are always different; and the last two cells of each character are always different. As a result, no combination of consecutive characters will result in a bar or module which is larger than two cells.

Fourth, in addition to the hexadecimal characters, the bar code also includes an end-of-line character (designated "H") which has seven consecutive marks. This end-of-line character provides a clear visual indication to the user of which direction the line is to be scanned. It also provides an easily recognized indication to the scanner 10 that the line has ended.

In the bar code embodiment of FIG. 11, the width of a single cell can be on the order of five mils (0.005 inch), so that each hexadecimal character is then only thirty-five mils (0.035 inch) in total width. This dimension is considerably smaller than employed in conventional bar codes, which require more bars and wider bar thicknesses. Obviously, greater widths can be employed; it is just that there is a decided space advantage, as hereinbefore mentioned, in utilizing a high density bar code.

7. The Bar Code Page Format

In an illustrative example, each bar code line 64 on the sheet 62 could include a total of 96 hexadecimal characters or "nibbles" which can be identified as "Nibble Numbers 0-95" (see Table 1). Each line 64 would begin with the start of a line character (D=1010101), followed by a pair of characters defining the line number, a pair of characters defining a function code, and a pair of characters indicating the quantity of data bytes contained in that line. In this example, the next 86 characters would be available as data characters. At the end of the line, there would be two characters which represent a check sum, followed by the end-of-line character (H=1111111).

The checksum byte at the end of each line represents a byte of data which, when added to all of the other characters in that line, will result in a pedetermined number, such as zero. This is a final check that all of the bytes of data in the line were properly read.

At the beginning of each program or data set is a Control Array formed by one or more lines 64. The Control Array provides the control unit 12 with all of the information which will be necessary in order for the control unit 12 to emulate an input device (such as a cassette) to the particular type of computer for which the program has been written.

8. Reader 14 Circuitry (FIG. 12)

Figure 12:
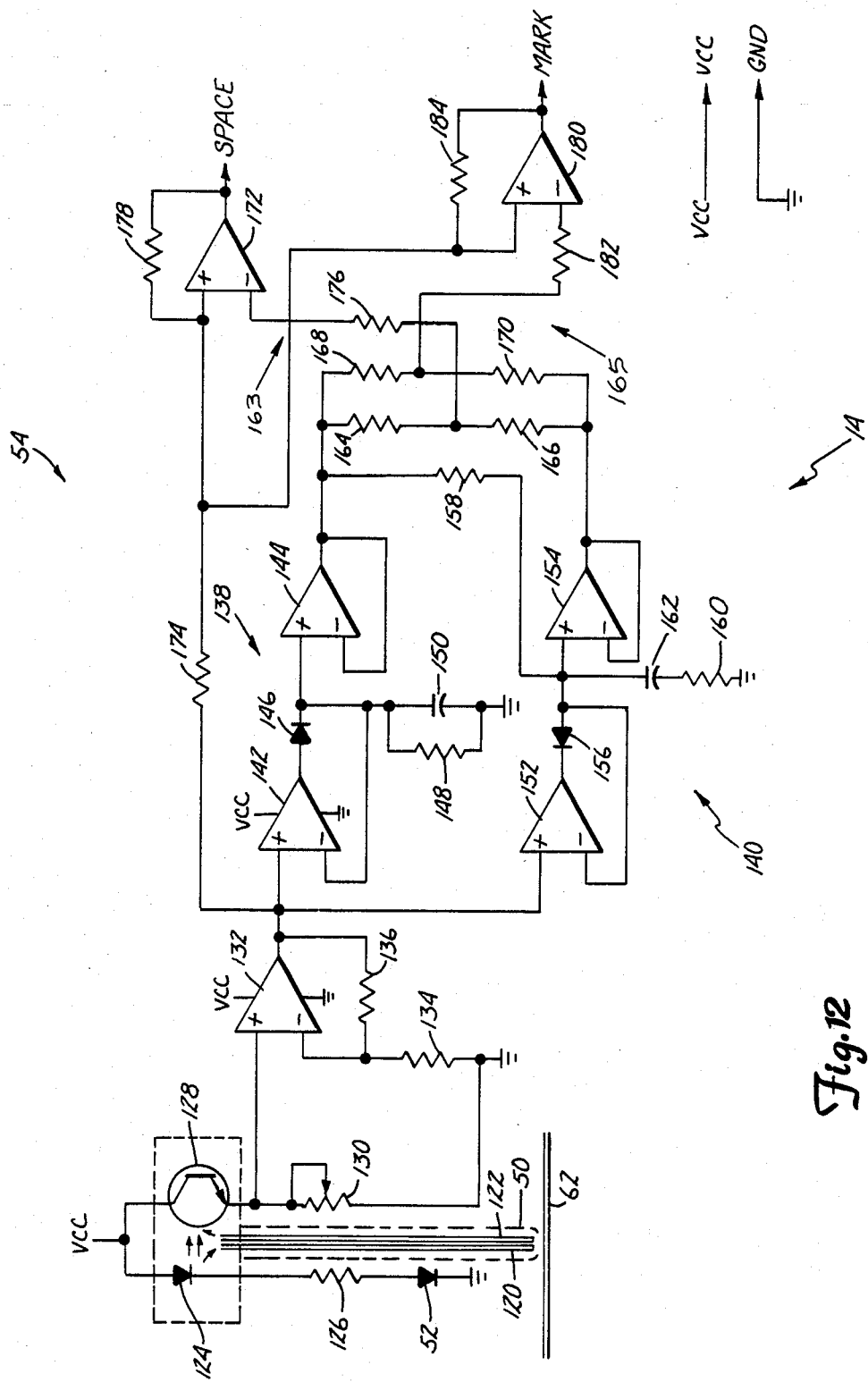
FIG. 12 is an electrical schematic diagram of the circuitry contained in the reader system exemplifying the present invention, and FIGS. 13A-13C collectively constitute an electrical schematic diagram of the circuitry contained in the control unit of the reader system of the present invention.

FIG. 12 is an electrical schematic diagram exemplifying the invention which shows the probe 50, the POWER ON indicator light 52, and the analog circuitry 54 of the reader 14. The analog circuitry 54 converts the bar code being scanned by the reader 14 into an output in the form of a pair of logic level pulses (designated "SPACE" and "MARK") which are supplied to the control unit 12.

The probe 50 of the reader 14, as can be discerned from FIG. 12, consists of a pair of fiber optic light guides 120 and 122. The light guide 120 receives light from a light emitting diode (LED) 124 and conducts that light downward to the lower end of the probe 50, where the light is directed onto the surface of the sheet 62. The LED 124, a resistor 126, and the POWER ON indicator light 52 (which is also a light-emitting diode) are connected in series between supply voltage VCC and ground.

The fiber optic light guide 122 receives light reflected from the sheet 62 and directs that light upward to a phototransistor 128. The collector-emitter current path of the phototransistor 128 is connected in series with a potentiometer 130, a circuit in this way being established between VCC and ground. The potentiometer 130 provides a factory adjustment for any change in gain due to variations in light leakage in probe 50.

The signal from the phototransistor 128 is amplified by a first stage amplifier circuit which includes an operational amplifier (op amp) 132 and resistors 134 and 136. In the depicted embodiment of the present invention, the first stage of amplification is very large with a gain on the order of about 400. This stage converts the relatively small (microampere) changes in current through the transistor 128 into relatively large (on the order of $\frac{1}{2}$ volt) changes in voltage at the output of the op amp 132.

The output of the op amp 132 is forwarded to a maximum detection circuit 138 and to a minimum detection circuit 140. The maximum detection circuit 138 includes op amps 142 and 144, a diode 146, a resistor 148, and a capacitor 150. The minimum detection circuit 140 includes op amps 152 and 154, a diode 156, resistors 158 and 160, and a capacitor 162.

In the maximum detection circuit 138, the diode 146 permits only positive going signals from the op amp 142 to charge the capacitor 150, so that the voltage on this capacitor 150, which is applied to the noninverting (+) input of the op amp 144, represents the maximum voltage. When the waveform produced by the op amp 132 (which is generally sinusoidal) is going through a negative half-cycle, the capacitor 150 is permitted to discharge slightly through the resistor 148 to ground. The time constant of the resistor 148 and capacitor 150 is selected so that the capacitor 150 discharges slowly enough that only legitimate peak voltages will be sensed, and yet fast enough that slight variations in peak voltages will be accommodated.

In the minimum detection circuit 140, the diode 156 permits only negative going signals to pass from the output of amplifier 152. The capacitor 162 is discharged through the diode 156 to the minimum voltage which appears at the output of the op amp 132. During each positive going portion of the cycle, the capacitor 162 is charged toward the maximum value which appears at the output of the op amp 144.

The sinusoidal output waveform from the op amp 132 is compared to first and second reference voltages by first and second comparator circuits 163 and 165 to produce the SPACE and MARK signals. The first comparator circuit 163 includes a first voltage divider (formed by resistors 164 and 166), an op amp 172 and resistors 174, 176 and 178. The second comparator circuit 165 includes a second voltage divider (formed by resistors 168 and 170), an op amp 180, and resistors 182 and 184.

The first comparator circuit 163 compares the output of the op amp 132 with the first reference voltage derived by the first voltage divider 164, 166 (which is connected between the outputs of the maximum and minimum detection circuits 138 and 140). When the signal from the op amp 132 exceeds the first reference voltage, the "SPACE" output of the op amp 172 is high. This indicates the presence of a space under the tip of the probe 50.

The second comparator circuit 165 compares the signal from the op amp 132 with the second reference voltage derived by the second voltge divider 168, 170 from the outputs of the maximum and minimum detection circuits 138 and 140. The second reference voltage is lower than the first reference voltage. When the signal exceeds the second reference voltage, the MARK output of the op amp 180 is high, and when the signal is less than the second reference voltage, the MARK output of the op amp is low. A low MARK output from the op amp 180 represents the presence of a "mark" under the probe 50.

The use of two voltage dividers to provide two reference voltages achieves an effective dead band in the detection of spaces and marks. The resistance of the resistor 164 is less than that of the resistor 166, so that the first reference voltage has a value greater than the mean of the maximum and minimum values for the maximum and minimum detectors 138 and 140. The resistance of the resistor 168 is greater than the resistance of the resistor 170, so that the second reference voltage has a value which is less than the mean of the maximum and minimum values. Resistors 178 and 184 provide hysteresis for the comparators 172 and 180 to help reject false signals generated by paper/ink variations.

9. The Control Unit Circuitry (FIGS. 13A–13C)

Figure 13A:
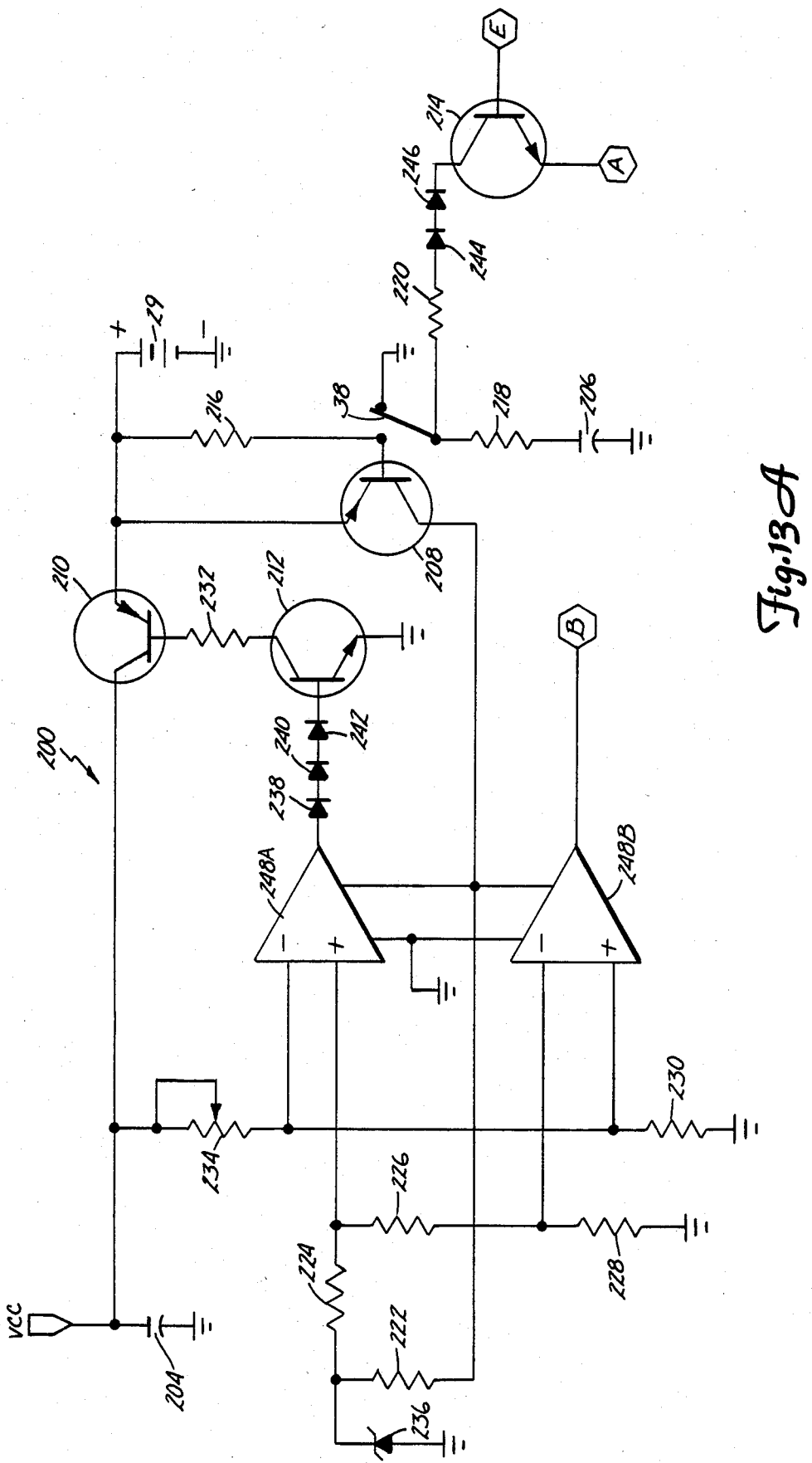

FIGS. 13A–13C collectively depict the circuitry of the control unit 12 which plays an important role in the practicing of the present invention. FIG. 13A shows power supply circuitry 200, which provides the power for both the control unit 12 and the reader 14.

Voltage regulator circuit 200 is powered by the battery 29 (the four cells of which would be located in the battery compartments 30 and 32 of the control unit 12). In the embodiment shown in 13A, the battery 29 includes four D cells connected in series to provide a combined voltage which is nominally six volts. Because the voltage supplied by the battery 29 can vary considerably, while the logic circuitry of the control unit 12 requires a supply voltage, VCC, which is within a very narrow range of +5 volts, the voltage regulator 200 converts the battery voltage to the regulated voltage VCC.

In the embodiment shown in FIG. 13A, the voltage regulator circuit 200 includes the battery 29, the power switch 38, capacitors 204 and 206, transistors 208, 210, 212 and 214, resistors 216, 218, 220, 222, 224, 226, 228, 230 and 232, a potentiometer 234, a zener diode 236, and diodes 238, 240, 242, 244 and 246.

Regulated voltage, VCC, is derived from the positive terminal of the capacitor 204. Charging of the capacitor 204 is controlled through the transistor 210, and the capacitor 204 is discharged through a voltage divider comprised of the potentiometer 34 and the resistor 230.

Operation of the voltage regulator circuit 200 is controlled by a power latch-on circuit formed by the power switch 38, the transistors 208 and 214, the capacitor 206, the resistors 244, 246 and a microcomputer 250 (FIG. 13B). As shown in FIG. 13A, the power switch 38 is in its normally open position, a condition in which it remains as long as the reader 14 is in the cradle 34 of the control unit 12. When the reader 14 is removed from the cradle 34, the plunger 28 is permitted to move upwardly, and the switch 38 is allowed to close.

As long as the power switch 38 is open, the transistor 208 is turned off (due to the reverse bias via the resistor 216). This deprives a pair of op amps 248A and 248B of power and, as a result, the transistors 210, and 212 remain turned off.

If the user has installed four cells comprising the battery 29 incorrectly, so that the polarity of the voltage is reversed, the regulator circuit 200, under these circumstances, protects the remaining circuitry of the scanner 10 from the reverse polarity because under those conditions neither transistor 208 nor transistor 210 will turn on even when the switch 38 closes.

When the power switch 38 closes (and the cells of the battery 29 are connected in the proper polarity relationship), current begins to flow from the battery 29 through the resistors 216 and 218 to charge the capacitor 206. As long as current continues to flow, the transistor 208 is turned on, which supplies power to the op amps 248A and 248B, and supplies current through resistor 222 to the zener diode 236. A regulator reference voltage is thereby established at the cathode of the zener diode 236. The reference voltage is reduced by a voltage divider formed by resistors 224, 226, and 228 to provide a first regulator reference voltage to the noninverting (+) input of the op amp 248A, and a second lower regulator reference voltage to the inverting (−) input of the op amp 248B.

The op amp 248A compares the first regulator reference voltage at its noninverting (+) input with the voltage at its inverting (−) input, which is derived from the voltage divider formed by the potentiometer 234 and resistor 230, and thus represents the supply voltage, VCC, across the capacitor 204. If the first regulator reference voltage exceeds the voltage derived from the capacitor 204, the output of the op amp 248A goes high, which supplies biasing current through the diodes 238, 240 and 242 to the base of the transistor 212. This causes the transistor 212 to turn on, which turns on the transistor 210. Once the transistor 210 is turned on, current is permitted to flow from the battery 29 to the capacitor 204, which causes voltage, VCC, to rise. When the voltage at the inverting (−) input of the op amp 148A equals the first regulator reference voltage at the noninverting input of the op amp 248A, the output of the op amp 248A goes low and the transistors 212 and 210 are turned off.

When the power switch 38 initially closes, current will continue to flow through the resistors 216 and 218 until capacitor 206 is charged to a level at which transistor 208 turns off, and at that point the remaining transistors 210 and 212 will turn off. The time constant for the charging of the capacitor 206 is selected, in one example, so that the time between switch 38 closing and turn off of the transistor 208 is such that within that time period the microcomputer 250 can perform initial reset and diagnostic routines to ensure that the scanner 10 is ready for operation. If the microcomputer 250 successfully completes the reset and diagnostic routines before the time period in which the charging of the capacitor 206 takes place, it will turn on the transistor 214, which shunts capacitor 206 and permits transistor 208 to remain on. If the microcomputer 250 fails to be reset or to complete its diagnostic procedures properly, the transistor 214 is not turned on, and the transistor 208 turns off, thereby removing power from the remaining circuitry of the voltage regulator 200.

The voltage regulator 200 also provides, through the output of the op amp 248B, a signal to the microcomputer 250 when a low voltage condition exists. As long as the voltage derived from capacitor 204 through the voltage divider comprised of the potentiometer 234 and resistor 230 exceeds the second regulator reference voltage, the output of the op amp 248B remains high. When the output goes low because the voltage at the noninverting (+) input of the op amp 248B drops below the second regulator reference voltage, the output of the op amp 248B goes low. This indicates to the microcomputer 250 that it should actuate an annunciator in the form of a buzzer 252 (FIG. 13B) to indicate a low voltage condition.

The digital logic and related circuitry of the control unit 12 is shown in FIGS. 13B and 13C. This circuitry includes the microcomputer 250, the buzzer 252, the audio jack 40, an address latch 254, RAM 256, ROM 258, capacitors 260, 262, 264, 266, 268, 270 and 272, a crystal oscillator 274, resistors 276, 278, 280 and 282, internal PROM jumper 284, EPROM available jumper 286, transistor 288, NAND gates 290, 292 and 294, and NOR gates 296 and 298.

As described previously, the microcomputer 250 performs reset and diagnostic functions upon power switch 38 being actuated by the removal of the reader 14 from its cradle 34. The reset circuit formed by the capacitor 266 and resistor 276 has a time constant which is sufficiently short so that the reset diagnostic functions can be performed in time for the microcomputer 250 to latch the voltage regulator 208 on within the period required to charge the capacitor 206.

The microcomputer 250 has onboard ROM and RAM storage. With the circuit shown in FIGS. 13B and 13C, the microcomputer 250 has the capability of being able to run on the basis of a program stored in the internal RAM or ROM or from external RAM 256 and or ROM 258. NAND gates 290, 292 and 294 and NOR gates 296 and 298 are used as control gates for controlling the selection of internal or external memory storage for storing various segments of a program.

The MARK and SPACE signals from the reader 14 are supplied to the T1 and T0 inputs, respectively, of the microcomputer 250. Based upon these inputs, the microcomputer 250 measures the bar scan time for each mark and space bar, determines whether the bar is a single or double-cell bar, and stores the single or double bit in memory.

The operation of the microcomputer 250 in converting the MARK and SPACE signals from the reader into digital data will be more fully appreciated from the following table:

BAR CODE INPUT AND TRANSLATION

I. "STAND-BY FOR BAR CODE INPUT"

The accumulated checksum, bit accumulator, hexadecimal character bit counter, and line byte counter are set to zero. A flag is set to indicate that the first hexadecimal character (4 bits) encountered is the high nibble of a byte.

II. "WAIT FOR 'D' CHARACTER"

The input from the optical wand is checked for valid bar scan times on the first character of the line of bar code. The first character is always a "D" hexadecimal character, which consists of only single-cell bars of alternating marks and spaces. If the measured mark or space bar scan times for this first character are too short or too long, then the optical wand is not yet scanning the actual "D" character and receiving spurious inputs. The last two cells of the "D" character are a single-cell space bar and a single-cell mark bar. These bars are used to calculate the initial reference bar scan times (high and low level synch) for future determination of single or double bars.

If no bar is detected, two other checks are performed. First, the battery is tested for low voltage. If the voltage is too low, an audible signal is generated, and the power is shut off. If the battery voltage is high enough, and if no bar has been detected for 30 seconds, an audible warning is generated. This warning informs the operator that the unit will shut itself of in approximately 30 more seconds if no bar code is scanned.

III. "COMPUTE BAR SCAN TIME"

Once the "D" character has been sensed, the reader input lines are checked for state transitions. An input level check is used to detect an input change of state. Upon occurrence of the first input state change, a timer is started. The next state change stops the timer. This timer value then becomes the bar scan time for the last bar. The level detention also determines whether the bar scan time is for a mark or space bar, depending upon which input line was being sensed. If this bar scan time is out-of-range, an error has occurred. In this case, an audible error tone is generated and the rest of the bar code line is ignored.

IV. "STORE BAR AS BITS"

The bar scan time is compared to the reference high (space) or low (mark) synch time to determine whether the bar is a single-cell or a double-cell bar. These reference synch times are derived from oe or more bar scan times of preceding bars of the same type. If the bar is a single-cell bar, a single "1" or a "0" bit is stored in the bit accumulator to represent the mark bar or space bar, respectively. The bit counter is incremented by one for a single-cell bar. If the bar is a double-cell bar, two "1" or "0" bits are stored in the bit accumulator and the bit counter is incremented twice (add 2). After the bits are stored, the new reference synch time is computed. If the bar is a single-cell bar, the bar scan time is multiplied by 1.5 and the result is used to derive the reference value for the next occurrence of this bar type (mark or space). If the bar is a double-cell bar, the bar scan time is divided by 2, multiplied by 1.5, and then used to derive the reference time for the next bar of this type. If the bit counter is less than 8, there are more cells to scan in the character. In this case, control transfers to Section III until a complete character is scanned.

V. "FIND HEX NIBBLE—STORE IN BYTE"

The bit accumulator is used in conjunction with a lookup table to find the 4-bit nibble represented by the bar code character. If no legal nibble is found, an audible error is generated, and the rest of the bar code line currently being scanned is ignored. If a legal value is found, the nibble is stored in a byte. If only the first of two nibbles required to fill a byte has been found, control returns to Section III to get the second nibble.

Once both nibbles for a byte have been found, the line byte counter is incremented. Using this counter value, the byte is checked for the following special cases:

A. Line Number

Every line of bar code contains a line number that is used to prevent lines from being scanned out of sequence. If the byte is a line number, it is checked for sequence. If the line number is legal, control is transferred to Section III to get the next character. If the line number is bad, this error is treated the same as a bad character read.

B. Function Code

Every line of bar code contains a function code that designates what should be done with the information on this line. For example, typical functions could be:
1. Send this line data to the host computer
2. Set-up host communications protocol
3. Add a new function to unit's operation
4. Initiate a self-diagnostic C. Nibble Count The number of characters on a line is included on every line of bar code to aid in bad read error detection. This value is checked for every character received to determine if the unit has somehow detected too many bar code characters.

D. Checksum

If the current byte is the line checksum, it is compared to the accumulated checksum. If this check is not valid, a bad read error has occurred.

VI. "STORE BYTE IN OUTPUT BUFFER"

If the byte is not one of the special cases, it is added to the accumulated checksum and transferred to a storage memory until the line read is complete. Once the end of a bar code line has been scanned, the function code is used to determine what to do with the data. After the function operation is completed, control is transferred to Section I to read the next line of bar code.

In general, the microcomputer 250 measures the bar scan time of each mark bar by measuring the time period from the moment the MARK signal at T1 goes low until it goes high. The microcomputer 250 measures the bar scan time of a space bar by measuring the time period from when the SPACE signal at T0 goes high until it goes low.

Once the bar scan time has been measured, the microcomputer 250 determines whether the bar is a single or double-cell bar by comparing the measured bar scan time with a reference time value which is 1.5 times the single cell time for one or more preceding bars of the same type. If a mark bar scan time has been measured, it is compared to the "low level synch time" value which is 1.5 times the single cell time value of one or more preceding mark bars. Similarly, if the bar is a space, it is compared to the "high level synch time" value which is 1.5 times the single cell time of one or more preceding spaces.

If the measured mark bar scan time is less than the low level synch time value, the microcomputer 250 determines that the mark bar was a single cell bar and stores a single "1" in its bit accumulator. The microcomputer 250 then computes a new low level synch value based upon the measured mark bar scan time. One or more preceding low level synch values are used to derive the new reference time value for use when the next mark bar scan time is measured.

If the measured mark bar scan time is greater than the low level synch time value, the microcomputer 250 determines that the mark bar is a double-cell bar and stores two "1's" in the bit accumulator. The microcomputer 250 also divides the measured mark bar scan time in half to produce an equivalent single-cell value, and then multiplies that value by 1.5 to generate a new low level synch time value. One or more preceding low level synch values are used to derive the new reference value for use when the next mark bar scan time is measured.

The operation of the microcomputer 250 with respect to space bars is similar. If the measured space bar scan time is less than the high level synch time value, the bar is a single-cell bar and the microcomputer 250 stores a single "0" in the bit accumulator. If, on the other hand, the measured space bar scan time is greater than the high level synch time value, the space bar is a double-cell bar, and the microcomputer 250 stores two "0's" in the bit accumulator. In the case of a single-cell space bar, the microcomputer 250 multiplies the measured bar scan time value by 1.5 to produce a new high level synch time value. In the case of a double-cell space bar, the measured space bar scan time is divided by 2 and then multiplied by 1.5 to produce the new high level synch time value. One or more preceding high level synch values are used to derive the new reference time to be used when the next space bar scan time is measured.

At the beginning of each line, the microcomputer 250 is waiting for the start of line hexadecimal character D. As the reader 14 reaches the final cells of the start of line character, the initial high level and low level synch time values are derived for use in measuring bar scan times of subsequent marks and spaces along the line. The measurement of bar scan times and the conversion of those bar scan times into stored bits in the bit accumulator and high level and low level synch values need not be described in detail. The microcomputer 250, it can be pointed out, combines the bits stored in the bit accumulator to form bytes of data.

As each byte is received and stored, the microcomputer 250 sums the values of that byte with previous bytes. At the end of each line 64, a checksum byte is provided which, when added to all of the previous values in the line, will result in a checksum which equals "0".

The microcomputer 250 provides an output to the computer through the audio jack 40. Ports P1.5 and P2.5 of the microcomputer 250 are connected through a resistor 279 to the base of the previously mentioned transistor 288, this transistor being an NPN type. By turning the transistor 288 on and off, the microcomputer 250 generates the data stream through audio jack 40 and a cable (not shown) which is connected to the computer (also not shown).

The microcomputer 250 drives the buzzer 252 through ports P1.7 and P2.7. By providing pulse trains of different frequency to the buzzer 252, the microcomputer 250 causes tones of different frequencies to be generated.

A Transmission Complete tone is generated when the control unit 12 has completed transmission to the computer. This tone can be a 2 KHz tone which lasts 0.5 second.

A Bad Unit tone is generated if the microcomputer 250 determines that the control unit 12 is not functioning properly during its initial power up diagnostic test. The Bad Unit tone is a "buzz" (low frequency) followed by a "beep" (high frequency).

A Timeout warning tone is generated if the reader 14 has been removed from the cradle 34, but no bar code has been read for a thiry second time period. The Timeout warning tone indicates to the user that the microcomputer 250 will turn off control unit 12 in, say, approximately thirty seconds if the reader 14 does not begin to produce mark and space input signals. The Timeout warning signal, therefore, avoids excessive drain of the battery 29 if the reader 14 is removed from its cradle 34 but not used. The Timeout tone may consist of two successive tones: a 400 Hz tone of 0.5 second duration followed by a 1.3 KHz tone of 1.0 second duration.

A Low Battery tone is produced by the microcomputer 250 if the signal at its port P1.1 indicates a low battery voltage condition. This tone warns the user that the battery should be replaced. The Low Battery Tone may consist of a 400 Hz tone of 0.5 second duration followed by a 2.7 KHz tone of 0.5 second duration, after which the microcomputer 250 turns on the scanner 10 by turning off transistor 214.

A Good Line Read tone is generated each time the reader 14 has completed a successful scan of one of the lines 64 of bar code. The determination of whether a correct scan has occurred is made by the microcomputer 250 based upon the line having the correct line number and the check sum equalling zero. The Good Line Read tone is illustratively 2.7 KHz for 0.5 second.

Conclusion

The present invention provides automatic power latch-on, low supply voltage, and nonuse time-out functions which ensure that the scanning system is operating properly. If not, the system is automatically turned off thereby avoiding excessive and unnecessary drain on the battery. This procedure significantly prolongs the life of the battery, and ensures that the system, when first turned on, is ready and capable of functioning properly.

The above functions are performed in a simple, yet effective, way by interaction of the microcomputer with the voltage regulator. The circuitry of the voltage regulator is simple and uses a minimum of components, while providing effective regulation of the supply voltage. Also, there is an automatic turn-off or de-energization of the scanning system by the microcomputer when circumstances so dictate.

What is claimed is:

1. A battery-powered optical bar code reading system comprising user-actuated power switch means for switching from a first to a second state to initiate operation of the system, a voltage regulator connected to the power switch means for providing a regulated supply voltage from a battery, the voltage regulator being turned on for an initial time interval in response to the power switch means being switched from its said first state to its said second state and remaining turned on thereafter only if a regulator control signal is received, an optical bar code reader powered by the regulated supply voltage for producing an output representative of an optical bar code as relative movement of the reader with respect to the optical bar code occurs, an annunciator for providing a warning in response to an annunciator control signal, and computer means powered by the regulated supply voltage for converting the output of the reader to digital data representative of the optical bar code, the computer means providing said regulator control signal and said annunciator control signal.

2. The system of claim 1 wherein the computer means performs predetermined initialization procedures upon receiving the supply voltage after the power switch means has switched to its said second state and provides the regulator control signal upon successful completion of the initialization procedures.

3. The system of claim 1 wherein the voltage regulator includes means for providing a signal to the computer means when the supply voltage is less than a predetermined value, and wherein in response to the signal from the voltage regulator the computer means provides the annunciator control signal to the annunciator which causes the annunciator to provide a low voltage warning.

4. The system of claim 3 wherein the computer means, after providing the annunciator control signal to the annunciator to cause the low voltage warning to be provided, discontinues providing the regulator control signal to the voltage regulator which causes the voltage regulator to turn off.

5. The system of claim 1 wherein the computer means provides the annunciator control signal to the annunciator to cause the annunciator to produce a nonuse time-out warning if the output of the reader has remained unchanged for a first predetermined time interval, and wherein the computer means discontinues providing the regulator control signal if the output of the reader continues to be unchanged during a second predetermined time interval following the nonuse time-out warning.

6. The system of claim 1 wherein the voltage regulator includes capacitor means for providing said supply voltage, charging current control means connected between said battery and the capacitor means for controlling current flow from the battery to the capacitor means as a function of a control signal, first comparator means for providing the control signal as a function of a comparison of a first signal derived from said supply voltage and a first reference voltage, integrator means connected through the power switch means to the battery for producing an integrator signal, comparator control means connected between the battery and the first comparator means for supplying current to the first comparator means when the power switch means is in its said second state and the integrator signal is less than a threshold value, and integrator disable means for preventing the integrator signal from reaching the threshold value in response to the regulator control signal.

7. A battery-powered optical bar code reading system comprising a voltage regulator for providing a regulated supply voltage based upon electrical energy from a battery, an optical bar code reader powered by the regulated supply voltage for producing an output representative of an optical bar code as relative movement of the reader with respect to the optical bar code occurs, computer means powered by the regulated supply voltage for converting the output of the reader to digital data representative of the optical bar code, an annunciator controlled by the computer means for providing a nonuse time-out warning when the output of the reader has remained unchanged for a first predetermined time interval, and wherein the computer means controls operation of the voltage regulator to cause the voltage regulator to discontinue providing said supply voltage if the output of the reader remains unchanged during a second predetermined time interval following the nonuse time-out warning.

8. The system of claim 7 and further including user actuated power switch means connected to the voltage regulator for switching from a first to a second state to initiate operation of the voltage regulator, and wherein the voltage regulator includes means for discontinuing operation of the voltage regulator at the end of an initial predetermined time interval after the user actuated power switch means has been switched to its said second state unless a regulator control signal is received from the computer means, and wherein the computer means performs predetermined initialization procedures during the initial time interval and provides the regulator control signal to the voltage regulator which permits continued operation of the voltage regulator after the end of the initial time interval if the computer means successfully completes said predetermined initialization procedures.

9. The system of claim 7 wherein the voltage regulator includes means for providing a signal to the computer means when the regulated supply voltage is less than a predetermined value, and wherein in response to the signal from the voltage regulator the computer means provides a signal to the annunciator which causes the annunciator to provide a low voltage warning.

10. The system of claim 9 wherein the computer means, after providing the signal to the annunciator to cause the low voltage warning to be provided, causes the voltage regulator to discontinue operation.

11. The system of claim 7 and further comprising user actuated power switch means connected to the voltage regulator for switching said switch means from a first to a second state to initiate operation of the voltage regulator.

12. The system of claim 11 wherein the voltage regulator includes capacitor means for providing said supply voltage, charging current control means connected between said battery and said capacitor means for controlling current flow from the battery to the capacitor means as a function of a control signal, first comparator means for providing said control signal as a function of a comparison of a first signal derived from said supply voltage and a first reference voltage, integrator means connected through said power switch means to the battery for producing the integrator signal, comparator control means connected between the battery and the first comparator means for supplying current to the first comparator means when said power switch means is in its said second state and the integrator signal is less than a threshold value, and integrator disable means for preventing the integrator signal from reaching the threshold value in response to a signal from the computer means.

13. A battery-powered electronic system which includes user-actuated power switch means for switching from a first to a second state to initiate operation of the device, voltage regulator means connected to the power switch means and to a battery for producing a supply voltage, and computer means powered by the supply voltage for controlling operation of the system as a function of input signals and a stored program, the computer means performing predetermined initialization procedures upon application of said supply voltage thereto after said power switch means switches to its said second state and providing a regulator control signal which indicates successful completion of the initialization procedures, wherein the voltage regulator means includes capacitor means for providing said supply voltage, charging current control means connected between the battery and the capacitor means for controlling current flow from said battery to the capacitor means as a function of a control signal, first comparator means for providing the control signal as a function of a comparison of a first signal derived from the supply voltage and a first reference voltage, integrator means connected through said power switch means to the battery for producing the integrator signal, comparator control means connected between the battery and the first comparator means for supplying current to the first comparator means when said power switch means is in its said second state and the integrator signal is less than a threshold value, and integrator disable means for preventing the integrator signal from reaching the threshold value in response to the regulator control signal from the computer means.

14. An optical bar code reading system comprising optical bar code reader means for producing an output representative of an optical bar code as relative movement of the reader with respect to the optical bar code occurs, battery means for providing electrical current, capacitor means for providing a supply voltage, user-actuated power switch means adapted to be switched from an open condition to a closed condition to initiate operation of the system, integrator means for receiving current from the battery means when the power switch means is closed, the integrator means producing an integrator signal which changes toward a threshold value with time, control transistor means for supplying current from the battery means when the power switch means is closed and the integrator signal is less than the threshold value, first comparator means powered by current from said control transistor means for comparing a first signal derived from the supply voltage to a first reference voltage, charging current control means connected between the battery means and the capacitor means for controlling current flow from the battery means to the capacitor means as a function of an output of the comparator means, computer means powered by the supply voltage for converting the output of the reader means to digital data representative of the optical bar code, the computer means performing predetermined initialization procedures upon application of the supply voltage thereto after the power switch means is closed and providing a disable signal upon successful completion of the predetermined initialization procedures, and integrator disable means for disabling the integrator means to permit continued operation of the computer means if the computer means provides a control signal before the integrator signal reaches its said threshold value.

15. The system of claim 14 and further including voltage reference means for receiving current from the control transistor means and producing said first reference voltage.

16. The system of claim 14 and further including second comparator means powered by current from the control transistor means for comparing a second signal derived from the supply voltage with a second reference voltage to produce a second comparator output signal indicative of a low supply voltage condition when the second signal derived from the supply voltage is less than the second reference voltage, and means for providing a low voltage warning in response to the second comparator output signal.

17. The system of claim 16 wherein the second comparator output signal is provided to the comparator means, and wherein the means for providing a low voltage warning includes annunciator means for providing the low voltage warning in response to a signal from the computer means.

18. The system of claim 17 wherein the computer means, after providing the signal to the annunciator means to produce the low voltage warning, discontinues the regulator control signal to permit the integrator means to charge until the threshold value is reached, thus interrupting the flow of current from the control transistor means to the first comparator means and causing the current control means to discontinue further flow of current from the battery means to the capacitor means.

19. The system of claim 14 and further including means for providing a signal to the computer means at an end of a first predetermined time interval during which the output of the reader means is unchanged, means responsive to the computer means for producing a warning signal indicating that the output of the reader means has remained unchanged for said predetermined time interval, and wherein the computer means discontinues the regulator control signal to the integrator disable means if the output of the reader means remains unchanged within a second predetermined time interval after the warning signal is provided.

* * * * *